(12) United States Patent
Lee

(10) Patent No.: US 7,446,215 B2
(45) Date of Patent: Nov. 4, 2008

(54) SOLID FAT PRODUCTS FROM SOME LIQUID OIL INGREDIENTS

(75) Inventor: John H. Lee, Olathe, KS (US)

(73) Assignee: Rigel Technology Corporation, Lenexa, KS (US)

( * ) Notice: Subject to any disclaimer, the term of this patent is extended or adjusted under 35 U.S.C. 154(b) by 866 days.

(21) Appl. No.: 10/993,280

(22) Filed: Nov. 22, 2004

(65) Prior Publication Data

US 2006/0019020 A1    Jan. 26, 2006

Related U.S. Application Data

(63) Continuation-in-part of application No. 10/895,689, filed on Jul. 21, 2004, now abandoned.

(51) Int. Cl.
C07C 51/00        (2006.01)
(52) U.S. Cl. .................. 554/156; 426/601; 426/807
(58) Field of Classification Search .................. 554/156
See application file for complete search history.

(56) References Cited

U.S. PATENT DOCUMENTS

| | | | |
|---|---|---|---|
| 4,138,505 | A | 2/1979 | Hart et al. |
| 4,216,234 | A | 8/1980 | Rawlings et al. |
| 4,217,370 | A | 8/1980 | Rawlings et al. |
| 4,427,572 | A | 1/1984 | Akers et al. |
| 5,496,572 | A | 3/1996 | Rudden |
| 5,514,388 | A | 5/1996 | Rohwer |
| 6,229,031 | B1 | 5/2001 | Strohmaier et al. |
| 6,368,657 | B1 | 4/2002 | Lee |
| 6,576,667 | B2 | 6/2003 | Strohmaier et al. |

*Primary Examiner*—Deborah D Carr

(57) ABSTRACT

A novel processing method of producing a solid fat products from air flotation sludge fat, vegetable soap stock and an oily liquid oil ingredient with more than 15% free fatty acid level on a fat basis is provided. The liquid fat or oil ingredient is heated to above 85 degree C., mixed with an alkali, dried to less than 18% moisture, and cooled to below 45 degree C. to convert the oily liquid fat or oil ingredient into the solid fat product in dry form. The product has the bypass fat function. The product is free-flowing and easy to be handled, delivered and applied.

14 Claims, No Drawings

SOLID FAT PRODUCTS FROM SOME LIQUID OIL INGREDIENTS

CROSS-REFERENCE TO RELATED APPLICATION

This application is a continuation-in-part application of U.S. patent application Ser. No. 10/895,689, filed Jul. 21, 2004 now abandoned.

FIELD OF THE INVENTION

The present invention relates to the processing method of treating and converting oily liquid Air Flotation sludge fat or vegetable soap stock into a non-oily solid product in dry form for easy handling, delivering and application. The new solid product has the bypass function for rumen.

BACKGROUND OF THE INVENTION

Air flotation (AF) systems such as Dissolved Air flotation (DAF) and Cavitation Air flotation (CAF) have been used in food processing plants and waste water treatment plants for many years. The purpose of AF systems is to reduce BOD (biological oxygen demand), COD (chemical oxygen demand), FOG (fats, oils and grease), SS (suspended solids), and TKN (total Kjeldahl nitrogen) in the waste water passing to sewage treatment or to discharge. Most food processing plants use large volume water to wash food products and produce waste water with high BOD, COD, FOG, SS, and TKN. Waste water is a major issue in food industry, which effects environment. The oily AF sludge (it is also often called AF skimming) from an air flotation system has large volume such as about 15,000 tons (or 30,000,000 pounds) per year from an average animal processing plant. The sludge is often processed into hot liquid oil by heat, vacuum, and centrifuge processes. The hot liquid oil becomes viscous fat after cooling down at room temperature. It is needed to be heated again to become a liquid oil form before applications. Customers need to spend more energy cost for the heat and stirring equipment for the agitation. Some farms have no the capacity to heat and to agitate AF sludge fat product. AF sludge fat has low value compared with normal fat ingredients. The sale price is only about 1/5 to 1/3 of normal fat or oil ingredients.

Vegetable soap stock such as soy, corn or canola oil soap stock is a major byproduct produced during vegetable oil process. The byproduct is an oily sludge, which normally has about 45% fat and 50% moisture. The oily sludge is not possible to be processed into a dry and non-oily product by a normal dry process. The sludge is often to be adjusted to low pH for low viscosity, heated and vacuumed into hot liquid oil after removing the moisture. It often becomes viscous after cooling down for a period of time and needs to be heated again into a liquid oil form before applications.

Over the years, various attempts have been made to convert and to improve oil ingredients into non-oily solid products. Some new processing methods to convert oily ingredients into non-oily products with some protein ingredients have been invented by author. It is necessary to process the oily ingredients into non-oily products without the protein ingredients to meet practical situations. A number of patents have been issued for these attempts. U.S. Pat. No. 6,576,667 discloses a method for manufacturing fatty acid salts from high glyceride content oils with eicosapentaenoic acid and docosaheaenoic acid into a calcium salt product by adding 2 to 3 equivalents of calcium oxide relative to the oils and 2 to 5 equivalents of water relative to the calcium oxide so that the calcium oxide hydrates and neutralizes the fatty acids to form calcium salts. The reaction is completed at 210-240 degree F. U.S. Pat. No. 6,368,657 discloses a method for converting oily DAF sludge into a non-oily solid fat-protein product with the protein precipitation process to binding the fat under the heat treatment by the author. The product has the bypass protein (95%) and bypass fat (85%) for ruminant animals. U.S. Pat. No. 6,229,031 discloses a method for preparing fatty acid glycerides into a calcium salt product by adding calcium oxide and water and then heating to a high temperature such as 150 degree C. at which the fatty acid glycerides saponify to form fatty calcium salts. The calcium soap salt product has the bypass function for ruminant animals. U.S. Pat. No. 5,514,388 discloses a process to treat protein with a base to increase the pH to such as 11 at first. Then a fat is added into the alkali protein. The protein firm gel is formed when the pH is lowed to 3 to 5. U.S. Pat. No. 5,496,572 discloses a process to form a ruminant feed stuff by a homogeneous mixture of animal or vegetable protein material, one or more fatty acids, and a calcium or magnesium compound by an extrusion process. U.S. Pat. No. 4,427,572 discloses a process to prepare a calcium soap product by saponifying an organic carboxylic acid with calcium hydroxide in a dipolar aprotic solvent such as acetone. Then the calcium soap product are separated from the reaction mixture and excess acetone is removed from the calcium soap product. U.S. Pat. No. 4,217,370 discloses a process to treat protein with a base to increase the pH to such as 11. Then a fat is added into the alkali protein. The protein and fat are mixed together before any pH change. The protein gel is formed when the pH is lowed to the isoelectric point. U.S. Pat. No. 4,216,234 discloses a process to render albumin medium with strongly alkaline such as 11.5 prior to the formation of a fat dispersion or emulsion, and thereafter the dispersion or emulsion is heated to form a gel product. U.S. Pat. No. 4,138,505 discloses a process to heat animal blood to a temperature in the range of from about 20 degree C. to 60 degree C., to adjust the pH to a level ranging from 9 to about 13 to form a blood solid gel, and thereafter recovering the fat-protein gel.

AF sludge fat and vegetable soap stock are low-value liquid fat or oil products. They also are not easy to be handled, delivered and applied to feed applications. They need to be reheated in most applications. It needs to develop some practical and economical methods to process AF sludge fat and vegetable soap stock into non-oily solid products without combining with a protein ingredient.

SUMMARY OF THE INVENTION

The present invention overcomes the problems of other patents and provides a novel process to convert oily liquid AF sludge fat or vegetable soap stock into a non-oily and free-flowing product in a dry solid form. The product can be used in applications directly. There is no extra heat process needed to warm the viscous AF sludge fat and vegetable soap stock into liquid oil ingredients before applications. The non-oily solid products are easier for handling, delivering, pelleting, and applying than the oily liquid products. The objective of the present invention is to provide the effective processing method, which is convenient and economical to be used.

It has been found that liquid AF sludge fat or vegetable soap stock can be converted into non-oily solid fat product in dry form by this effective processing method in this invention. AF sludge fat or vegetable soap stock with or without moisture is heated to above 85 degree C. The moisture is removed by a heat or heat plus vacuum if there is moisture in the raw fat or oil ingredient. An alkali such as calcium hydroxide, calcium oxide, sodium hydroxide, potassium hydroxide, iron hydroxide, magnesium hydroxide or their combination is added and mixed. The rate for the alkali against the fat or oil ingredient is in a wide range such as from 2%:98% to 50%:50% on a solid basis. It is optional to moisture the alkali before the use. Calcium hydroxide and calcium oxide are most commonly used. The product is a liquid gel form at hot temperature such as 120 degree C. There is water formed after the reaction between calcium hydroxide or calcium oxide and free fatty acids. The moisture may be removed by a heat or heat plus vacuum process. When the moisture in the product is dried to a low level such as less than 18%, then the product is cooled down to below 45 degree C. by cooling equipment or at room temperature, the product becomes a strong solid form. The product is easily broken into particles. The oily property of the fat or oil ingredient is changed into the non-oily property of the solid product processed with above processing method. The solid product is free-flowing and easy to be handled, delivered and applied to nutritional applications. It also has been found the product processed in this invention has bypass fat function such as 80% for rumen. Sodium or potassium hydroxide is added to hard the product. When calcium hydroxide, calcium oxide, iron hydroxide, magnesium hydroxide or their combination is used, the product is low water soluble. When sodium or potassium hydroxide is used, the product viscosity increases during the mixing process and the product is high water soluble. The process in this invention can be added into current AF sludge fat or vegetable soap stock process. There is no major additional processing equipment and facility needed, which lows the production cost. The product is non-oily solid form instead of normal hot liquid oil form. The solid product can be used directly without reheat process, which is totally different from handling current liquid AF sludge fat or vegetable soap stock.

There are polar and non-polar groups in the molecules of AF sludge fat or vegetable soap stock. The non-polar groups in the molecules bind each other with hydrophobic bond. The polar groups (—COOH) of free fatty acids in AF sludge fat or vegetable soap stock are changed into salts such as calcium salt. When AF sludge fat or vegetable soap stock is mixed with calcium hydroxide, calcium oxide, sodium hydroxide, magnesium oxide, magnesium hydroxide or their combination, the salt products are formed. The oily property is converted into non-oily property. The treatment with the heat and alkali can inactivate microorganisms, which makes the products safer for applications. The formed salt products are on the product surface, which changes oily AF sludge fat or vegetable soap stock into non-oily products. Heat helps the process to form the non-oily salt products. Fatty acid calcium salt products are not water soluble. Fatty acid sodium salt products water soluble.

Vegetable soap stock has free fatty acids such as from 25% to 65% and AF sludge fat has free fatty acids such as from 15% to 85% on a fat basis. It has also been found that a liquid oil ingredient with free fatty acids more than 15% level on a fat basis can be converted into non-oily solid fat product in a dry form by this effective process. Animal fat and vegetable oil such as beef tallow and palm oil are often processed into free fatty acid products. Conjugated linoleic acid (CLA) oil has free fatty acid level above 90%, which relates to human and animal health. U.S. Pat. Nos. 6,203,843, 5,554,646 and 5,428,072 relate to CLA oil. Omega-3 fatty acid oil is another common example. The ingredients include raw fat or oil materials, finished products, intermediate products, and byproducts from plant, animal, and industrial sources with free fatty acids more than 15%. A liquid fat or oil ingredient with free fatty acids more than 15% on a fat basis heated to above 85 degree C. The moisture is removed by a heat or heat plus vacuum if there is moisture in the raw ingredient. An alkali such as calcium hydroxide, calcium oxide, sodium hydroxide, potassium hydroxide, iron hydroxide, magnesium hydroxide or their combination is added and mixed. The rate for the alkali against the fat or oil is in a wide range such as from 2%:98% to 50%:50% on a solid basis. Calcium hydroxide and calcium oxide are most commonly used. The product is a liquid gel form at the hot temperature such as 130 degree C. There is water formed after the reaction between calcium hydroxide or calcium oxide and free fatty acids. The moisture may be removed by a heat or heat plus vacuum process. When the moisture in the product is dried to a low level such as less than 18%, then the product is cooled down to below 45 degree C. by cooling equipment or at room temperature, the product becomes a strong solid form. The oily property of normal fat or oil products is changed into non-oily property of the products processed with above processing method. It also has been found the product processed in this invention has bypass function for rumen. The solid product can be used directly. Sodium or potassium hydroxide is added to hard the products. When calcium hydroxide, calcium oxide, iron hydroxide, magnesium hydroxide or their combination is used, the product is low water soluble. When sodium or potassium hydroxide is used, the product viscosity increases during the mixing process and the product is high water soluble. The solid product is and free-flowing and easy to be handled, delivered and applied to nutritional applications.

The product in the liquid gel form or solid form may be mixed with nutritional ingredients such as soybean meal, corn meal, or wheat flour together. When the product in the liquid gel form is mixed with amino acid, peptide, vitamin, or special ingredients together, the product provides a carrier to encapsulate and protect the ingredients for animals or human. When the product is mixed with molasses and processed into a fat-molasses block product, the block product at a high fat level is not oily. It has bypass function for dairy animals. When the product in the liquid gel form is mixed with nutritional ingredients, a fat block product is formed. A single fat block may also be produced. The product is mixed with anti-cake agent such as silica or calcium oxide powder to increase the free-flowing property. When the final product is heated to such as 60-110 degree C., the product is still a non-oily solid or gel form, which is not a normal liquid oil form because the product is a kind of fatty acid salts. So the product can be used for extrusion and pellet processes without significant change for its physical structure. But normal oil or fat products are melt into a oily liquid oil form under heat, which can not be used for extrusion and pellet processes.

DETAIL DESCRIPTION OF THE PREFERRED EMBODIMENTS

The following examples set forth preferred methods in accordance with the invention. It is to be understood, however, that these examples are provided by way of illustration and nothing therein should be taken as a limitation upon the overall scope of the invention.

EXAMPLE 1

Soy soap stock without moisture (60 grams) was heated to about 120 degree C. for five minutes. Calcium hydroxide (6 grams) was added and mixed. After mixing for eight minutes, the heat was stopped. The product was set at room temperature for two hours. Then the solid product was broken into particles. The analytical data were as follows: fat (85.1%) and moisture (4.9%). The particle product was non-oily and free-flowing.

EXAMPLE 2

Beef tallow with free fatty acids 98% (50 grams) was heated to about 130 degree C. for five minutes. Calcium oxide (4 grams) was added and mixed. After mixing for ten minutes, the heat was stopped and sodium hydroxide solution (3 ml) was added and mixed. Then the product was set at room temperature for two hours. The solid product was broken into particles. The analytical data were as follows: fat (87.2%) and moisture (5.0%). The particle product was non-oily and free-flowing.

EXAMPLE 3

DAF fat (100 grams) from a dissolved air flotation (DAF) unit in a chicken processing plant was heated to about 130 degree C. for eight minutes. Calcium hydroxide (10 grams) was added. After mixing for ten minutes, the heat was stopped. The product was set at room temperature for two hour. Then the solid product was broken into particles. The analytical data were as follows: fat (91.5%) and moisture (5.8%). The particle product was non-oily and free-flowing. The product had the bypass fat (88.7%) on a fat basis by the incubation in ruminant fluid for 24 hours.

EXAMPLE 4

Raw soy soap stock with about 50% moisture (500 grams) was heated to about 110 degree C. for twenty-five minutes. Calcium hydroxide (20 grams) was added and mixed. After mixing for ten minutes, the heat was stopped and sodium hydroxide solution (15 ml) was added and mixed. Then the mixed product was set at room temperature for overnight. Then the solid product was broken into particles. The analytical data were as follows: fat (87.3%) and moisture (5.7%). The particle product was non-oily and free-flowing. The product had the bypass fat (68.5%) on a fat basis by the incubation in ruminant fluid for 24 hours.

EXAMPLE 5

Brown grease (200 grams) from a dissolved air flotation (DAF) unit in a pork processing plant was heated to about 130 degree C. for eight minutes. Calcium hydroxide (20 grams) was added. After mixing for fifteen minutes, the heat was stopped. The product was set at room temperature for two hours. Then the solid product was broken into particles. The analytical data were as follows: fat (91.4%) and moisture (5.3%). The particle product was non-oily and free-flowing. The product had the bypass fat (90.0%) on a fat basis by the incubation in ruminant fluid for 24 hours.

EXAMPLE 6

Raw soy soap stock with about 50% moisture (500 grams) was heated to about 110 degree C. for twenty-five minutes. Calcium hydroxide (25 grams) was added and mixed. After mixing for fifteen minutes, the heat was stopped. Then the mixed product was set at room temperature for overnight. Then the solid product was broken into particles. The analytical data were as follows: fat (91.9%) and moisture (5.0%). The particle product was non-oily and free-flowing. The product had the bypass fat (76.3%) on a fat basis by the incubation in ruminant fluid for 24 hours.

What is claimed is:

1. A method of preparing a solid fat product from vegetable soap stock comprising heating to above 85 degree C., adding an alkali, drying to less than 18% moisture, and cooling to below 45 degree C. to convert the vegetable soap stock into the solid fat product in dry form.

2. The method of claim 1 wherein the alkali is calcium hydroxide, calcium oxide, sodium hydroxide, iron hydroxide, potassium hydroxide, magnesium hydroxide or in combination.

3. The method of claim 1 wherein the product is used as bypass fat for rumen.

4. The method of claim 1 wherein a vacuum process is used to remove the moisture in the product.

5. A method of preparing a solid fat product from air flotation sludge fat comprising heating to above 85 degree C., adding an alkali, drying to less than 18% moisture, and cooling to below 45 degree C. to convert the sludge fat into the solid fat product in dry form.

6. The method of claim 5 wherein the alkali is calcium hydroxide, calcium oxide, sodium hydroxide, iron hydroxide, potassium hydroxide, magnesium hydroxide or in combination.

7. The method of claim 5 wherein the product is used as bypass fat for rumen.

8. The method of claim 5 wherein a vacuum process is used to remove the moisture in the product.

9. A method of preparing a solid fat product from a liquid fat or oil ingredient with more than 15% free fatty acid level on a fat basis comprising heating to above 85 degree C., adding an alkali, drying to less than 18% moisture, and cooling to below 45 degree C. to convert the liquid oil into the solid fat product in dry form.

10. The method of claim 9 wherein the oil has more than 15% free fatty acid level on a fat basis from vegetable, animal or industrial source.

11. The method of claim 9 wherein the alkali is calcium hydroxide, calcium oxide, sodium hydroxide, iron hydroxide, potassium hydroxide, magnesium hydroxide or in combination.

12. The method of claim 9 wherein the product is used as bypass fat for rumen.

13. The method of claim 9 wherein the product is used for protecting nutritional ingredients.

14. The method of claim 9 wherein a vacuum process is used to remove the moisture in the product.

* * * * *